(12) United States Patent
Vega et al.

(10) Patent No.: US 6,411,213 B1
(45) Date of Patent: Jun. 25, 2002

(54) RADIO FREQUENCY IDENTIFICATION TAG SYSTEM USING TAGS ARRANGED FOR COUPLING TO GROUND

(75) Inventors: Victor Allen Vega, Hercules; John H. Rolin, San Jose, both of CA (US); Richard Fletcher, Cambridge, MA (US); Sebastian Thomas Kakkanad, San Jose, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/031,848

(22) Filed: Feb. 27, 1998

Related U.S. Application Data

(63) Continuation-in-part of application No. 08/540,813, filed on Oct. 11, 1995.

(51) Int. Cl.[7] ............................................. G08B 13/181
(52) U.S. Cl. .................... 340/573.3; 119/720; 340/539; 340/572.1; 340/825.54; 340/825.72; 455/41
(58) Field of Search ........................ 340/573.3, 572.7, 340/572.6, 572.1, 539, 531, 825.54, 825.72; 119/720; 455/41

(56) References Cited

U.S. PATENT DOCUMENTS

| | | | |
|---|---|---|---|
| 3,843,036 A | 10/1974 | Monahan et al. .............. 29/740 |
| 4,605,844 A | 8/1986 | Haggan ....................... 235/380 |
| 4,650,981 A | 3/1987 | Foletta ........................ 235/449 |
| 4,783,646 A | 11/1988 | Matsuzaki ............... 340/572.1 |
| 4,818,855 A | * 4/1989 | Mongeon et al. ....... 340/825.72 |
| 4,900,386 A | 2/1990 | Richter-Jorgensen .... 340/572.1 |
| 4,960,983 A | 10/1990 | Inoue .......................... 235/449 |
| 4,970,495 A | 11/1990 | Matsumoto et al. ...... 340/572.1 |
| 5,081,445 A | 1/1992 | Gill et al. ................ 340/572.1 |
| 5,099,227 A | * 3/1992 | Geiszler et al. ........ 340/825.54 |
| 5,221,831 A | 6/1993 | Geiszler |
| 5,288,235 A | 2/1994 | Sobhani ........................ 439/67 |
| 5,430,441 A | 7/1995 | Bickley et al. ......... 340/825.54 |
| 5,528,222 A | 6/1996 | Moskowitz et al. ...... 340/572.1 |
| 5,566,441 A | 10/1996 | Marsh et al. .................. 29/600 |
| 5,682,032 A | * 10/1997 | Philipp ........................ 235/422 |
| 5,682,143 A | 10/1997 | Brady et al. ............. 340/572.1 |
| 5,710,458 A | 1/1998 | Iwasaki ....................... 257/679 |
| 5,711,146 A | * 1/1998 | Yano et al. .................. 119/720 |
| 5,786,626 A | 7/1998 | Brady et al. ................. 257/673 |
| 5,847,447 A | 12/1998 | Rozin .......................... 257/678 |
| 5,850,187 A | 12/1998 | Carrender et al. |
| 5,854,480 A | 12/1998 | Noto |
| 6,001,211 A | 12/1999 | Hiroyuki |
| 6,133,833 A | * 10/2000 | Sidlauskas et al. ....... 340/572.1 |
| 6,147,605 A | * 11/2000 | Vega et al. ............... 340/572.7 |
| 6,211,799 B1 | * 4/2001 | Post et al. ..................... 341/33 |

FOREIGN PATENT DOCUMENTS

| | | |
|---|---|---|
| DE | 40 17 934 C2 | 1/1992 |
| EP | 0 245 196 A2 | 11/1987 |
| EP | 0 260 221 A3 | 3/1988 |
| EP | 0 260 221 A2 | 3/1988 |

* cited by examiner

Primary Examiner—Julie Lieu
(74) Attorney, Agent, or Firm—Wayne J. Egan; Val Jean F. Hillman

(57) ABSTRACT

A radio frequency identification tag system (10) utilizes a radio frequency identification tag (16) that includes stored information. The tag includes an antenna element (28) and a common electrode (26), the common electrode being coupled to ground (70). The antenna element electrostatically receives an exciter signal (30) from a proximately-located exciter (12). Upon receiving the exciter signal, the tag becomes energized, thereby causing it to generate a read signal (32) based on the stored information. The antenna element then electrostatically sends the read signal to a proximately-located reader (14), which detects the stored information. Both energy and data are capacitively coupled by virtue of the unbalanced nature of the network, thus resulting in decreased coupled impedance.

57 Claims, 4 Drawing Sheets

RADIO FREQUENCY IDENTIFICATION TAG SYSTEM USING TAGS ARRANGED FOR COUPLING TO GROUND

CROSS-REFERENCE TO RELATED APPLICATION

This is a continuation-in-part of prior U.S. patent application Ser. No. 08/540,813, filed Oct. 11, 1995 by Ted Geiszler et al. and entitled "Remotely powered electronic tag and associated exciter/reader and related method," the disclosure of which prior application is hereby incorporated by reference, verbatim and with the same effect as though it were fully and completely set forth herein.

FIELD OF THE INVENTION

This application relates to the field of radio frequency identification tags including, but not limited to, a radio frequency identification tag system using tags arranged for coupling to ground.

BACKGROUND OF THE INVENTION

Radio frequency identification tags and radio frequency identification tag systems are known, and find numerous uses. For example, radio frequency identification tags are frequently used for personal identification in automated gate sentry applications protecting secured buildings or areas. Information stored on the radio frequency identification tag identifies the person seeking access to the secured building. Older systems require the person accessing the building to insert or swipe their identification tag into or through a reader for the system to read the information from the identification tag. A radio frequency identification tag conveniently reads the information from the radio frequency identification tag at a small distance using radio frequency (RF) data transmission technology eliminating the inserting or swiping operation. Most typically, the user simply holds or places the radio frequency identification tag near a base station, which is coupled to a security system securing the building or area. The base station transmits an excitation signal to the radio frequency identification tag that powers circuitry contained on the radio frequency identification tag. The circuitry, responsive to the excitation signal, communicates the stored information from the radio frequency identification tag to the base station, which receives and decodes the information. The read information is communicated to the security system and, if appropriate, access is granted to the individual.

A typical technology for powering and reading a radio frequency identification tag is inductive coupling or a combination of inductive power coupling and capacitive data coupling. Inductive coupling requires incorporating a coil element into the radio frequency identification tag. The coil element is excited (or "energized") by an excitation signal from a base station to provide power to the radio frequency identification tag circuitry. The radio frequency identification tag coil, or a second tag coil, may be used to transmit and receive information between the radio frequency identification tag and the base station. Inductive coupling technology is relatively expensive, particularly for applications where it may be desirable to have a disposable radio frequency identification tag such as in an inventory management application. Radio frequency identification tags relying on inductive coupling are also sensitive to orientation of the radio frequency identification tag with respect to the base station since the field created by the excitation signal must intersect the coil element at substantially a right angle for effective coupling. Furthermore, read ranges for inductively coupled devices are generally on the order of several centimeters. Longer read distances are desirable, and for certain applications such as electronic animal identification, baggage tracking, parcel tracking and inventory management applications, are necessary.

Other radio frequency identification tag technologies include magnetically coupled, magnetically and electrostatically coupled and dipole coupled electrostatic technologies. While offering certain performance enhancements, and in some cases cost advantages, over inductive coupling technology, read ranges with these other technologies can be limited. For example, in an article surveillance system for books, compact disks (CD) and other related media, it is necessary to read the radio frequency identification tag as it passes through a standard doorway—generally about 90 centimeters (cm). Similarly, because of the vast differences in sizes of parcels and baggage an ability to read the radio frequency identification tag at a substantial distance is imperative. As will be further appreciated orientation of the radio frequency identification tag with respect to the base station can not be prearranged, and therefore, can not be allowed to substantially effect read distances. Each of the mentioned technologies tends to be overly orientation sensitive.

Thus, there is a need for an improved radio frequency identification tag system.

BRIEF DESCRIPTION OF THE DRAWINGS

Preferred exemplary embodiments of the invention are illustrated in the accompanying drawings in which like reference numerals represent like parts throughout.

DESCRIPTION OF THE PREFERRED EMBODIMENTS

A radio frequency identification tag system in accordance with preferred embodiments of the present invention utilizes a radio frequency identification tag having at least two electrodes. A first of the two electrodes is adapted as a low impedance common electrode and the second of the two electrodes forms an antenna element that electrostatically couples, through the air, to receive an excitation signal and to send a data signal. Both energy and data are capacitively coupled by virtue of the unbalanced nature of the network resulting in decreased coupled impedance.

Figure 1:
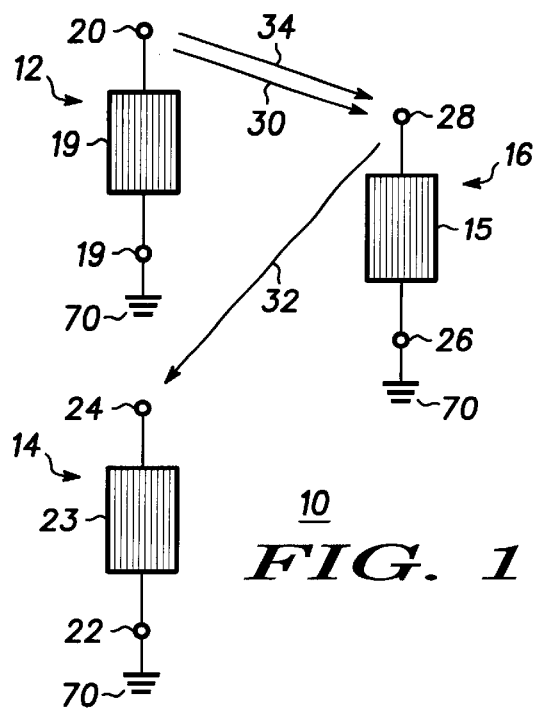
FIG. 1 is a block diagram illustration of a radio frequency identification tag system in accordance with a preferred embodiment of the present invention.

An apparatus in accordance with a preferred embodiment of the present invention is shown in FIG. 1 of the drawings. More particularly, a radio frequency identification tag system 10 includes: 1) a proximately-located electrostatic exciter 12, 2) a proximately-located electrostatic reader 14 and 3) a proximately-located radio frequency identification tag 16. Electrostatic exciter 12 includes an exciter common electrode 18 and an exciter antenna element 20 coupled to an exciter circuit 19. Electrostatic reader 14 includes a reader common electrode 22 and a reader antenna element 24 coupled to a reader circuit 23. Radio frequency identification tag 16 includes a tag common electrode 26 and a tag antenna element 28 coupled to a tag circuit 15, the tag circuit 15 containing a stored tag information. In a preferred implementation, exciter common electrode 18, reader common electrode 22 and tag common electrode 26 are coupled to earth ground 70.

Electrostatic exciter 12 provides an exciter signal 30. When radio frequency identification tag 16 is proximate to exciter antenna element 20, exciter signal 30 is electrostatically coupled, through the air, from exciter antenna element 20 to tag antenna element 28. Radio frequency identification tag 16 becomes energized based upon the exciter signal 30. In accordance with tag circuit 15 and the stored tag information, radio frequency identification tag 16 generates a read signal 32 containing some or all of the stored tag information, which is communicated from tag circuit 15 to tag antenna element 28. Read signal 32 is then electrostatically coupled from tag antenna element 28 to reader antenna element 24. Electrostatic reader 14 electrostatically receives read signal 32 at reader antenna element 24, demodulates/decodes read signal 32 to recover the stored tag information therefrom and, as appropriate, communicates the stored tag information to other system elements (not shown). In a preferred implementation, read signal 32 is a reflected signal modulated with the stored tag information via reflected load modulation. It will be appreciated that additional forms of modulation such as amplitude modulation (AM), frequency modulation (FM) or phase modulation (PM) may also be used to convey the stored tag information in read signal 32.

Electrostatic exciter 12 may be advantageously constructed from available tag exciter circuitry, such as, for example, Motorola Indala's ASR-120 base station (part no. 05200-006 available from Motorola Indala Corporation, 3041 Orchard Parkway, San Jose, Calif. 95134). The ASR-120 device is adapted by forming and coupling a suitable exciter electrode, for example a copper plate electrode, to one of the dipole electrode connections thereby forming the exciter antenna element 20. The other dipole electrode connection is coupled to earth, thereby forming the exciter common electrode 18. As the ASR-120 is also adaptable to receive from a radio frequency identification tag the stored tag information, one will appreciate that it may be further adapted to include the reader antenna element coupled to the read electrode connection.

Figure 3:
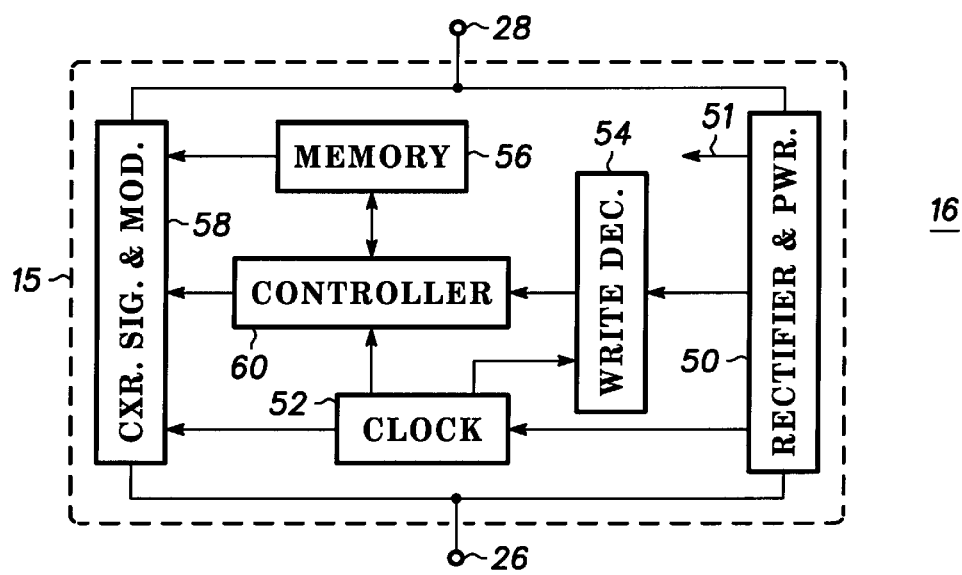
FIG. 3 is a block diagram illustration of a radio frequency identification tag for use in a radio frequency identification tag system such as the system shown in FIG. 1 and in accordance with a preferred embodiment of the present invention.

Referring now to FIG. 3, in a read-write embodiment of the present invention radio frequency identification tag 16 is advantageously constructed from a TEMIC e5550 circuit chip (available from Temic North America Inc., Basking Ridge, N.J.). In this regard, and with reference to FIG. 3, tag circuit 15 includes operatively coupled: 1) a rectifier and tag power circuit 50, 2) a clock circuit 52, 3) a write decoder 54, 4) a memory 56, 5) a carrier signal and modulator circuit 58 and 6) a controller 60. More particularly, tag antenna element 28 is coupled to both rectifier and tag power circuit 50 and to carrier signal and modulator circuit 58, which in turn are respectfully coupled to tag common electrode 26. Rectifier and tag power circuit 50 receives exciter signal 30 via tag antenna element 28 and upon becoming energized provides a direct current (dc) power supply 51. Exciter signal 30 is further coupled via rectifier and tag power circuit 50 to write decoder 54 and clock circuit 52. Clock circuit 52 provides a clock signal to each of write decoder 54, carrier signal and modulator circuit 58 and controller 60. Memory 56 retains the stored tag information and is accessed by controller 60 and carrier signal and modulator circuit 58. Upon excitation, carrier signal and modulator circuit 58 generates read signal 32 with the appropriate modulation and couples it to tag antenna element 28. As described, read signal 32 is preferably a reflected signal modulated via load modulation. It will be appreciated, however, that modulations, such as amplitude modulation (AM), frequency modulation (FM) and phase modulation (PM) may be applied either separately or in combination to read signal 32 to convey the stored tag information. In an alternate read-only embodiment of radio frequency identification tag 16, the Indala I341 chip available from the aforementioned Motorola Indala Corporation may be used. It will be appreciated, however, in this embodiment that write decoder 54 is not included.

Figure 5:
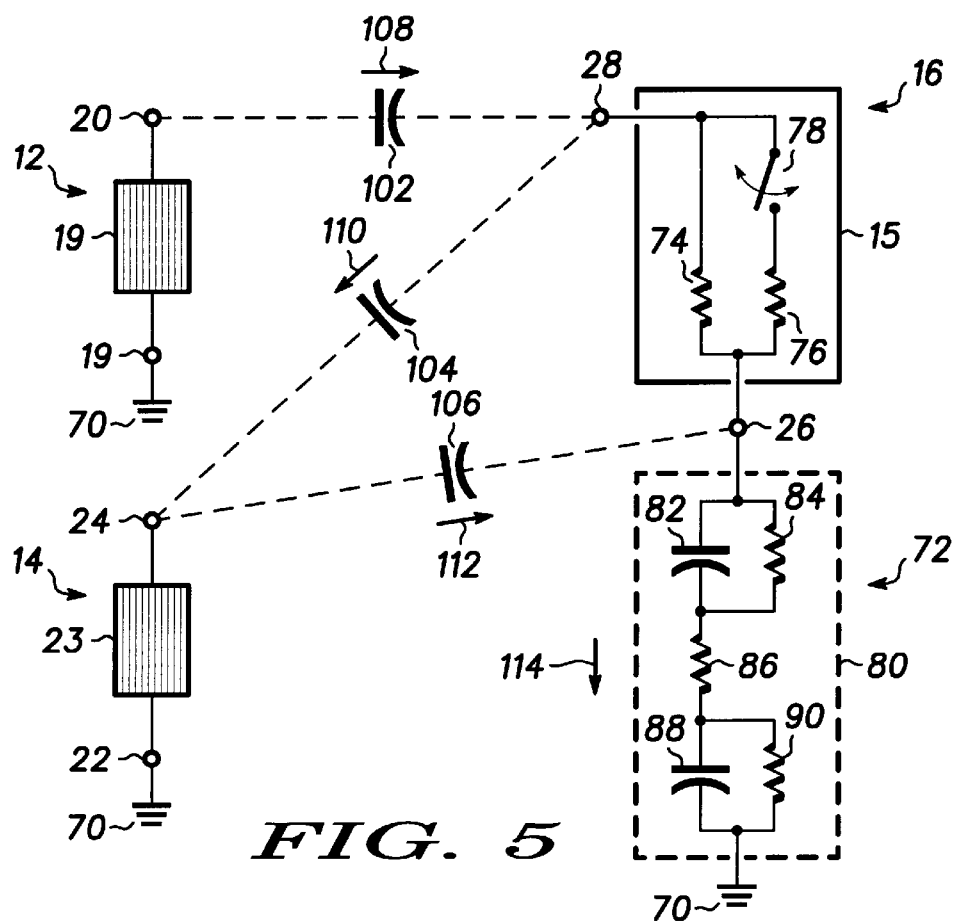
FIG. 5 is a schematic circuit illustration of the radio frequency identification tag system shown in FIG. 1.

More particularly, and with reference to FIG. 5, in certain preferred embodiments of the present invention, radio frequency identification tag 16 is adapted to couple between a person's body or an animal's body, body 72, to earth ground 70. That is, tag common electrode 26 is adapted to couple to body 72 and further through body 72 to earth ground 70. In FIG. 5, radio frequency identification tag 16 is represented as a constant load 74 (the resistive equivalent of the circuit elements) and a modulated load 76 through action of modulation switch 78. The coupling of radio frequency identification tag 16 to ground is shown as total effective impedance 80. Total effective impedance 80 represents, 1) the capacitance 82 and the resistance 84 of the tag common electrode 26 to body 72 interface, 2) the resistance 86 of body 72 and 3) the capacitance 88 and resistance 90 of body 72 to earth ground 70 interface. It is possible that resistance 84 may be very large, even infinite, either by design or as a result of degradation of the contact of tag common electrode 26 to body 72 (such as by oxidation and other environmental effects). If capacitance 82 is sufficiently large, however, it will provide an effective current path between tag common electrode 26 and body 72. Similarly, resistance 90 may be very large or infinite. However, if capacitance 88 is also sufficiently large it will provide an effective current path to earth ground 70. Laboratory testing has in fact verified that total effective impedance 80 may be maintained substantially lower than any of reactance 102, reactance 104 or reactance 106, respectively, the reactance of the air interface between: 1) exciter antenna element 20 and tag antenna element 28, 2) tag antenna element 28 and reader antenna element 24 and 3) reader antenna element 24 and tag common electrode 26. Thus, most of the excitation current 108 will be returned to electrostatic reader 14 through total effective impedance 80, shown as return current 114, and not as reader antenna element 24 to tag antenna element 28 current 110 or reader antenna element 24 to tag common electrode 26 current 112. Hence, coupling electrostatic exciter 12, electrostatic reader 14 and radio frequency identification tag 16 each to a common ground in this manner provides an enhanced current path through radio frequency identification tag 16 and beneficially increases effective read ranges.

In another embodiment (not shown), radio frequency identification tag 16 is adapted to couple to an article such as, for example, luggage, a package, a parcel or a retail sales article. In this embodiment, the tag common electrode 26 is arranged for coupling to the article, and further arranged for coupling to ground by means of the article.

As noted above, it is contemplated in certain embodiments of the present invention to transmit a write signal to radio frequency identification tag 16 and to configure radio frequency identification tag 16 to act upon the transmitted write signal. In this regard and with reference once again to FIG. 1, electrostatic exciter 12 is adapted to provide in addition to exciter signal 30 a transmitted write signal 34. Most preferably, transmitted write signal 34 is a modulation of exciter signal 30 and contains, for example, an operational code or a command, for configuring radio frequency identification tag 16 or directing it to perform a function. Within radio frequency identification tag 16, write decoder 54 decodes, i.e., demodulates, transmitted write signal 34 to recover the write information and communicates the write information to controller 60. Controller 60 initiates a write operation during which the write information is communicated to and retained within memory 56 as part of the stored tag information. As mentioned above, read signal 32 is based upon the stored tag information.

Figure 2:
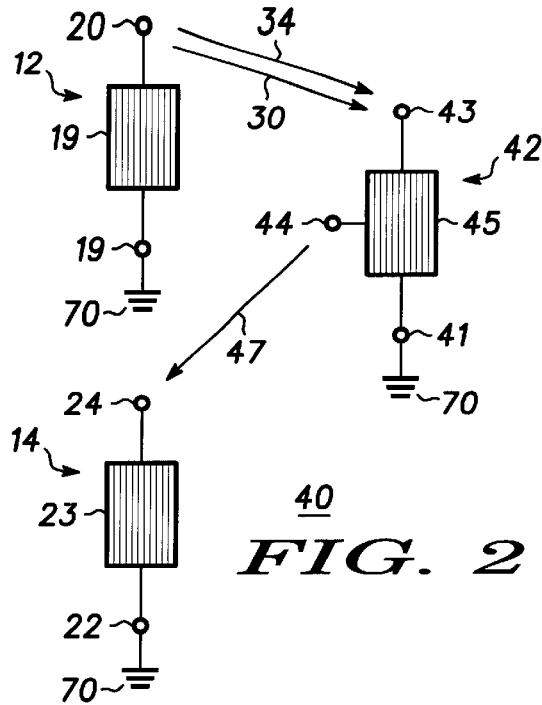
FIG. 2 is a block diagram illustration of a radio frequency identification tag system in accordance with an alternate preferred embodiment of the present invention.

An apparatus in accordance with an alternate preferred embodiment of the present invention is shown in FIG. 2. More particularly, radio frequency identification tag system 40 includes: 1) the electrostatic exciter 12, 2) the electrostatic reader 14 and 3) a proximately-located radio frequency identification tag 42. Electrostatic exciter 12 and electrostatic reader 14 are as described above. Radio frequency identification tag 42 includes a tag common electrode 41, a first tag antenna element 43 and a second tag antenna element 44 coupled to a tag circuit 45. Similar to the radio frequency identification tag 16 discussed with FIG. 1 above, the tag common electrode 41 is coupled to earth ground 70.

Figure 4:
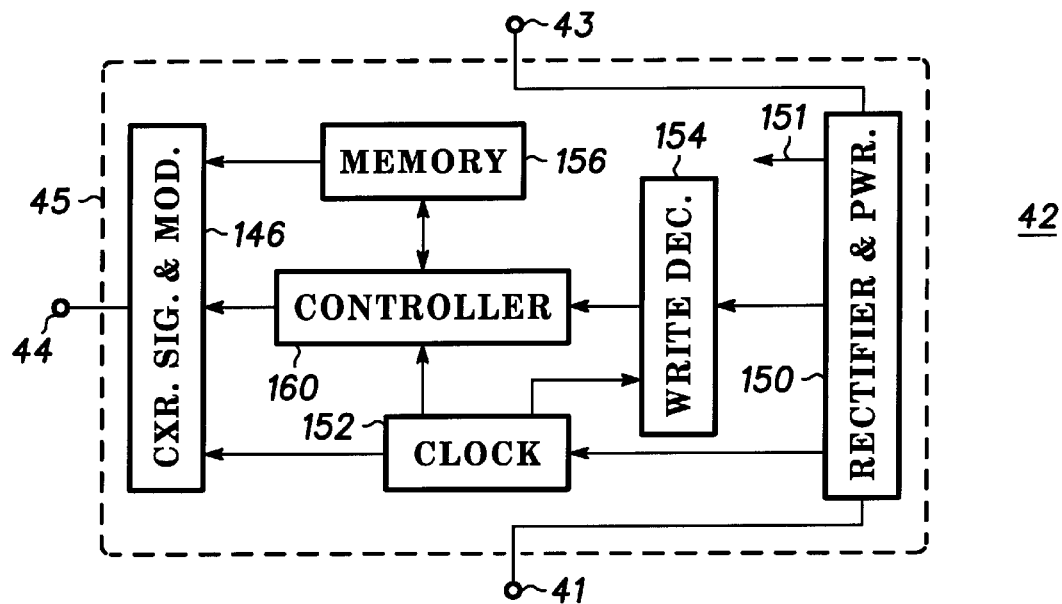
FIG. 4 is a block diagram illustration of a radio frequency identification tag for use in a radio frequency identification tag system such as the system shown in FIG. 2 and in accordance with an alternate preferred embodiment of the present invention.

With particular reference to FIG. 4, in a read-write embodiment of the present invention radio frequency identification tag 42 is advantageously constructed from the aforementioned TEMIC e5550 circuit chip. In this regard, and with reference to FIG. 4, tag circuit 45 includes operatively coupled: 1) a rectifier and tag power circuit 150, 2) a clock circuit 152, 3) a write decoder 154, 4) a memory 156, 5) a carrier signal and modulator circuit 146 and 6) a controller 160. Third tag electrode 44 is coupled to carrier signal and modulator circuit 146. Similar to tag circuit 15 discussed with FIG. 3 above, rectifier and tag power circuit 150 receives exciter signal 30 via first tag antenna element 43 and upon becoming energized provides a direct current (dc) power supply 151. Exciter signal 30 is further coupled via rectifier and tag power circuit 150 to write decoder 154 and clock circuit 152. Clock circuit 152 provides a clock signal to each of write decoder 154, carrier signal and modulator circuit 146 and controller 160. Memory 156 retains the stored tag information and is accessed by controller 160 and carrier signal and modulator circuit 146. Carrier signal and modulator circuit 146 is uncoupled from both tag common electrode 41 and first tag antenna element 43, and includes read signal generation and modulation circuitry. Upon excitation, carrier signal and modulator circuit 146 generates and electrostatically transmits a transmitted read signal 47 via second tag antenna element 44 to reader antenna element 24. Transmitted read signal 47 is preferably a transmitted signal having an AM, FM and/or PM modulation applied thereto to convey some or all of the stored tag information. Electrostatic reader 14 electrostatically receives transmitted read signal 47 at reader antenna element 24 and demodulates transmitted read signal 47 to recover the transmitted information including any stored tag information therefrom. In an alternate read-only embodiment of radio frequency identification tag 42, the aforementioned Indala I341 chip may be used. It will be appreciated, however, in this embodiment that write decoder 154 is not included.

With reference once again to FIG. 2, electrostatic exciter 12 is adapted to provide in addition to exciter signal 30 a transmitted write signal 34. Most preferably, transmitted write signal 34 is a modulation of exciter signal 30 and contains, for example, an operational code or a command, for configuring radio frequency identification tag 42 or directing it to perform a function. Within radio frequency identification tag 42, write decoder 154 decodes, i.e., demodulates, transmitted write signal 34 to recover the write information and communicates the write information to controller 160. Controller 160 initiates a write operation during which the write information is communicated to and retained within memory 156 as part of the stored tag information. Transmitted read signal 47 is based upon the stored tag information.

Figure 6:
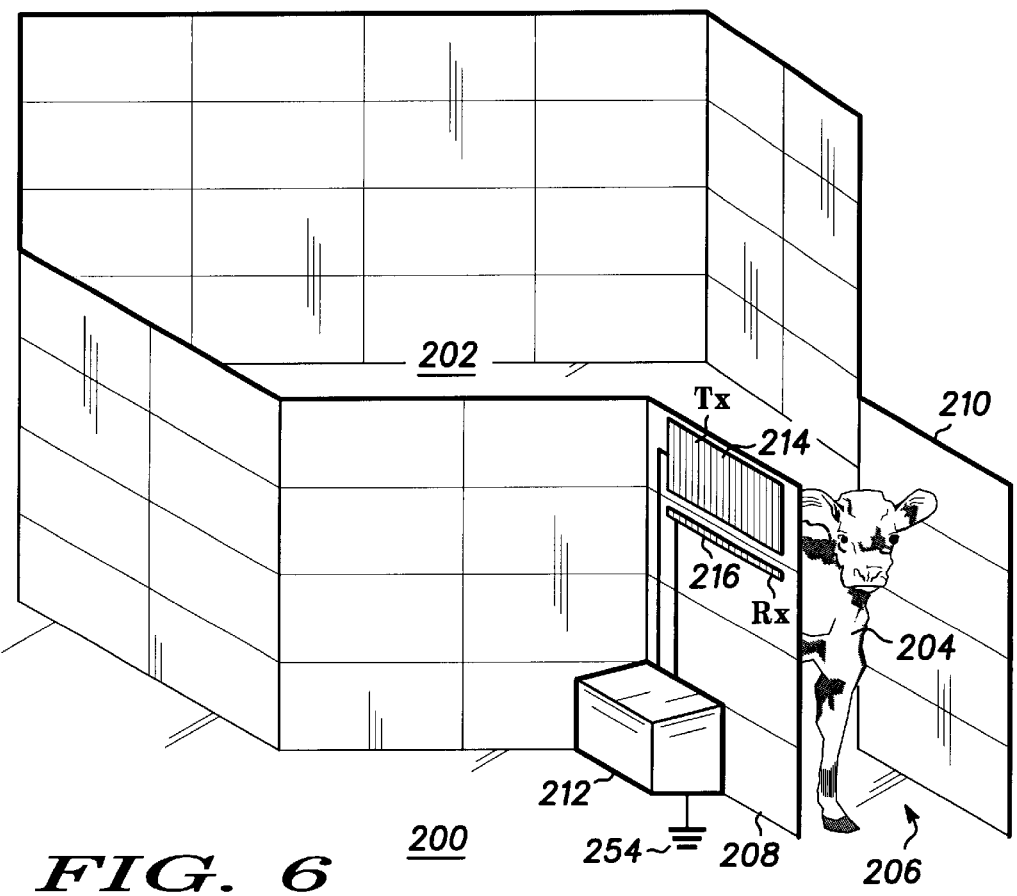
FIG. 6 is a schematic illustration of a preferred implementation of a radio frequency identification tag system in accordance with the preferred embodiments of the present invention.
Figure 8:
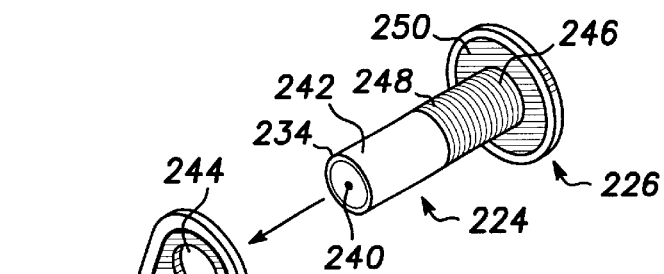
FIG. 8 is an exploded assembly perspective view of a radio frequency identification tag in accordance with a preferred embodiment of the present invention for use in the system shown in FIG. 6.
Figure 8:
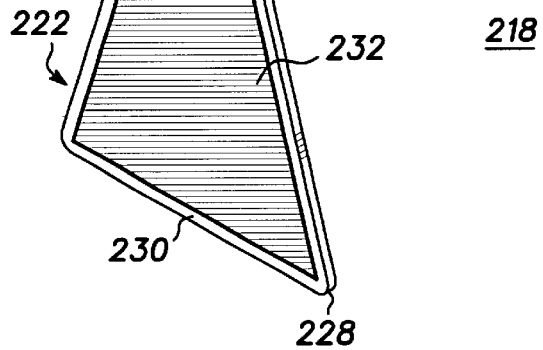

Drawing FIGS 8. 6 through 10 illustrate a preferred implementation of a radio frequency identification tag system in the form of livestock management system 200. Referring particularly to FIG. 6, livestock management system 200 includes a corral 202 for holding a plurality of livestock, one of which is shown as a livestock 204. Corral 202 further includes a sensing chute 206 adapted from a first fence member 208 spaced apart from and substantially parallel to a second fence member 210. Positioned adjacent sensing chute 206 is an exciter/reader 212 performing a combined excitation and read function. In a preferred embodiment, secured into a vertical portion first fence member 208 is an exciter antenna element 214 and a reader antenna element 216 each of which are coupled to exciter/reader 212. Each of exciter antenna element 214 and reader antenna element 216 are made from a suitable conductive material, such as copper. Further, exciter antenna element 214 is made with a substantially larger surface area than reader antenna element 216. Exciter/reader 212 is further suitably coupled to earth ground 254. It will be appreciated that in alternate, and equally preferred embodiments, either or both of fence member 208 and fence member 210 may be equipped with an exciter antenna element and/or a reader antenna element, Moreover, than one exciter/reader 212 may be used.

Figure 7:
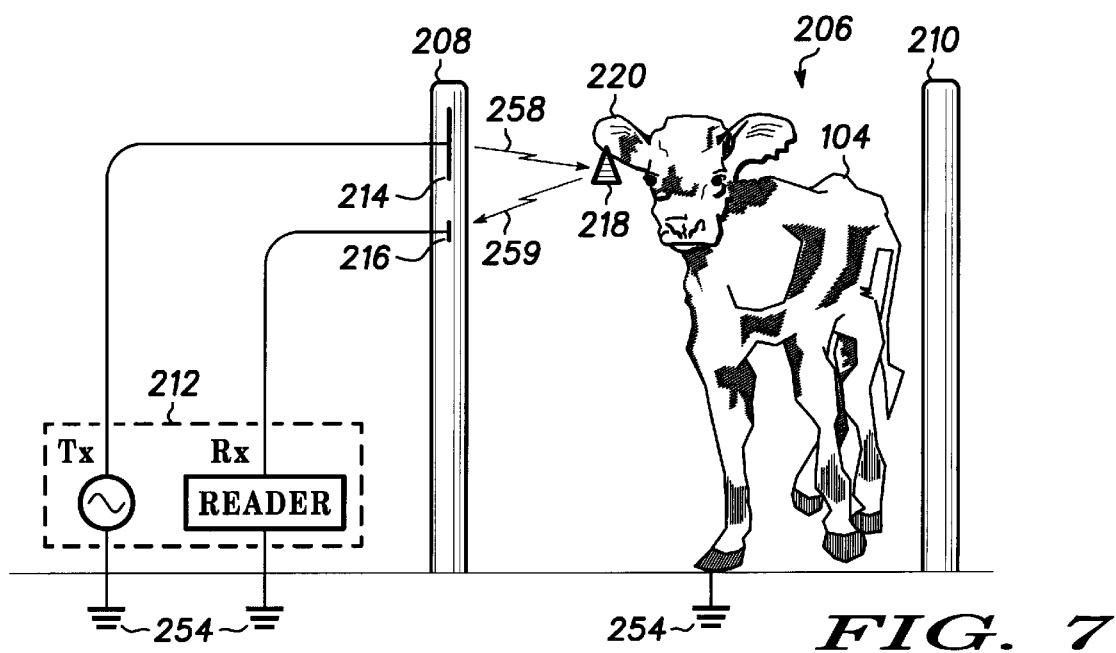
FIG. 7 is a front view illustration of the radio frequency identification tag system shown in FIG. 6.

With continued reference to FIG. 7 and reference now to FIG. 8, fence member 208 and fence member 210 have a height that is greater than, but not substantially so, the tallest anticipated livestock. The height of fence member 208 and fence member 210 is selected so as to permit attachment of exciter antenna element 214 and reader antenna element 216 approximate the head of livestock 204 as it passes through sensing chute 206. Fence member 208 and fence member 210 are further positioned in spaced relationship with a width slightly wider than an expected widest livestock so as to allow the expected widest livestock to pass through, yet still guide thinner livestock in proximate relationship to exciter antenna element 214 and reader antenna element 216. In a preferred embodiment, each livestock 204 is fitted with a radio frequency identification tag 218. Most preferably radio frequency identification tag 218 is secured through an ear 220 of livestock 204 so that as livestock 204 passes through sensing chute 206 radio frequency identification tag 218 will move into proximity with exciter antenna element 214 and reader antenna element 216. It will be appreciated that the tag may be secured on either ear of livestock 204, and as described that an exciter antenna element 214 and a reader antenna element 216 may be arranged within either or both of fence member 208 and fence member 210.

Figure 9:
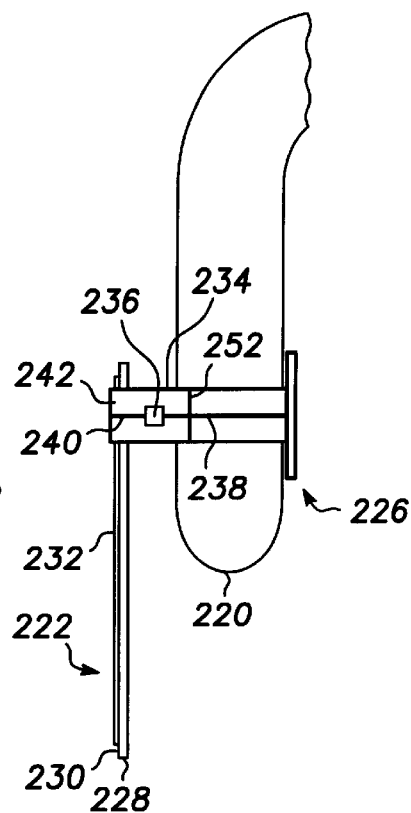
FIG. 9 is a side view of the radio frequency identification tag shown in FIG. 8.

With reference to FIGS. 8 and 9, each radio frequency identification tag 218 includes: 1) a front plate 222, 2) a post 224 and 3) a back plate 226. As seen in FIG. 8 and FIG. 9, in a first embodiment of radio frequency identification tag 218, front plate 222 includes a body 228, constructed from an electrically insulating material, having a major surface 230 onto which is formed an antenna 232. Body 228 is further formed with an aperture 244 for receiving post 224.

Post 224 is formed integral to back plate 226 and includes a cylindrical housing 234. Secured within cylindrical housing 234 is a tag circuit 236. Tag circuit 236 is substantially of the construction shown in FIG. 3. A tag common electrode 238 is coupled to a conductor 240 formed internal to and running axially along cylindrical housing 234 to an end 242 opposite back plate 226, End 242 is adapted to engage aperture 244 for securing front plate 222 to post 224 and to concomitantly couple conductor 240 to antenna 232. End 246 of cylindrical housing 234 is formed with a conductive element 248 that engages a conductive element 250 formed on back plate 226. A tag antenna element 252 is coupled to conductive element 248 and conductive element 250. Each of tag common electrode 238 and tag antenna element 252 are coupled to tag circuit 236.

As best seen in FIG. 8, post 224 is secured through the ear 220 of livestock 204 with back plate 226 nearest the head. Conductive element 248 and conductive element 250 are in close contact with ear 220. End 242 extends outwardly through ear 220 and away from the animal's head and has front plate 222 secured thereto. In this manner, antenna 232 is coupled to tag common electrode 238 and is substantially insulated from livestock 204. Second electrode 252 is coupled to conductive element 248 and conductive element 250 and is substantially electrically coupled (preferably via both resistive and capacitive coupling, but at least via capacitive coupling) to livestock 204. Livestock 204 is further in contact with earth ground 254.

In operation, as livestock 204 passes through sensing chute 206 excitation signal 258 is electrostatically coupled from exciter antenna element 214 to antenna 232 of radio frequency identification tag 218. Radio frequency identification tag 218, and hence tag circuit 236, is energized by the excitation signal 258 and responds thereto. In accordance with a preferred embodiment of the present invention, radio frequency identification tag 218 causes a reflected read signal 259, load modulated to include stored tag information, to be electrostatically coupled from antenna 232 to reader antenna element 216. Combined exciter/reader 212 is suitably coupled to a data management system (not shown) for counting, tracking, or otherwise managing movement of the livestock. Read ranges of combined exciter/reader 212 are advantageously enhanced through use of a monopole arrangement of radio frequency identification tag 218, i.e., an arrangement in which electrode 238 is coupled to antenna 232 and electrode 252 is coupled via the livestock 204 to earth ground 254.

Figure 10:
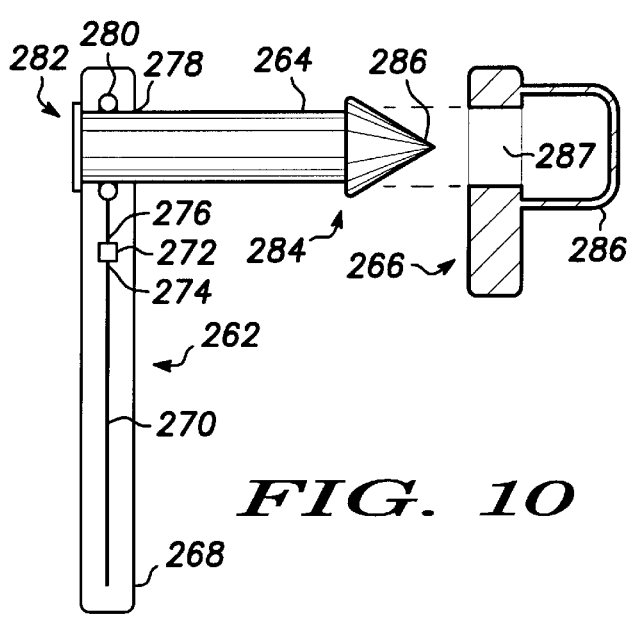
FIG. 10 is a side view, partially in cross-section, of a radio frequency identification tag in accordance with an alternative preferred embodiment of the present invention for use with the system shown in FIG. 6.

With reference now to FIG. 10, an alternative embodiment for a radio frequency identification tag 260 is shown. Radio frequency identification tag 260 includes; 1) a front plate 262, 2) a post 264 and 3) a back plate 266. Front plate 262 includes a body 268, formed from an insulating material, into which is embedded an antenna 270. Antenna 270 is coupled to a tag common electrode 274, which is coupled to a tag circuit 272 also embedded in body 268. A tag antenna element 276 is coupled to tag circuit 272 and is also coupled to a conductive o-ring 280 secured to an inner diameter of an aperture 278 formed in body 268. A first end 282 of post 264 is received through aperture 278 and is electrically coupled to o-ring 280. A second end 284 of post 264 is formed in a point 285 so as to be capable of piercing through ear 220 of livestock 204. Once inserted through ear 220 end 284 is secured through an aperture 287 of back plate 266 securing radio frequency identification tag 260 to livestock 204. Back plate 266 may further include a cover 286 to occlude end 284 guarding against injury to livestock 204. Back plate 266 is preferably formed from conductive material, such as conductive plastic, to enhance electrical coupling of radio frequency identification tag 262 to livestock 204. Further, body 268 substantially insulates antenna 270, and hence tag common electrode 274, from livestock 204. Operation of radio frequency identification tag 260 is substantially as described above for radio frequency identification tag 218.

In accordance with the present invention, effective read ranges for electrostatically coupled radio frequency identification tags may be enhanced by coupling the electrostatic exciter, the electrostatic reader and the radio frequency identification tag to a common ground where the total impedance between the radio frequency identification tag and the common ground can be made sufficiently small. In one preferred embodiment, a low total impedance of the radio frequency identification tag coupling to common ground is created by coupling the radio frequency identification tag though a person's or an animal's body to ground. There may be instances were an article, such as luggage, a package, a parcel, a retail sales article, and the like, can provide a sufficiently low total impedance, and such applications for radio frequency identification tags and radio frequency identification tag systems are within the scope of the present invention.

In summary, referring again to FIGS. 1–2, there has been disclosed a radio frequency identification tag system (10 or 40) including an electrostatic exciter 12, an electrostatic reader 14 and at least one radio frequency identification tag (16 or 42), the electrostatic exciter including an exciter circuit 19, an exciter common electrode 18 and an exciter antenna element 20, the exciter common electrode and the exciter antenna element coupled to the exciter circuit, the exciter common electrode arranged for coupling to ground 70, the exciter circuit arranged for generating an exciter signal 30 and coupling the exciter signal to the exciter antenna element, the exciter antenna element arranged for electrostatically sending the exciter signal to the at least one radio frequency identification tag, the electrostatic reader including a reader circuit 23 and a reader antenna element 24, the reader antenna element coupled to the reader circuit, the reader antenna element arranged for electrostatically receiving a read signal (32 or 47) from the at least one radio frequency identification tag and coupling the read signal to the reader circuit, the at least one radio frequency identification tag including a stored tag information, the read signal based on the stored tag information, and the reader circuit arranged for detecting the stored tag information.

Referring now to the radio frequency identification tag system 10 depicted in FIG. 1, there has been disclosed a first embodiment of a radio frequency identification tag 16 including a tag circuit 15, a tag common electrode 26 and a tag antenna element 28, the tag common electrode and the tag antenna element coupled to the tag circuit, the tag common electrode arranged for coupling to ground; the tag antenna element arranged for electrostatically receiving the exciter signal 30 from the exciter antenna element and coupling the exciter signal to the tag circuit; the tag circuit arranged for becoming energized based on the exciter signal, generating the read signal and coupling the read signal to the tag antenna element; the tag antenna element arranged for electrostatically sending the read signal 32 to the reader antenna element; and the read signal being a reflected signal.

Referring now to the radio frequency identification tag system 40 depicted in FIG. 2, there has been disclosed an alternate embodiment of a radio frequency identification tag 42 including a tag circuit 45, a tag common electrode 41, a first tag antenna element 43 and a second tag antenna element 44, the tag common electrode, the first and second tag antenna elements coupled to the tag circuit, the tag common electrode arranged for coupling to ground; the first tag antenna element arranged for electrostatically receiving the exciter signal 30 from the exciter antenna element and coupling the exciter signal to the tag circuit; the tag circuit arranged for becoming energized based on the exciter signal, generating the read signal and coupling the read signal to the second tag antenna element; the second tag antenna element arranged for electrostatically sending the read signal 47 to the reader antenna element; and the read signal being a transmitted signal.

Some advantages of radio frequency identification tags arranged for coupling to ground, in accordance with the present invention, as compared to prior magnetic-based tags, are now discussed.

First, radio frequency identification tags of the present invention are less expensive than prior magnetic-based tags. This is explained as follows. In contrast to the prior magnetic-based tags, tags of the present invention do not have resonant tank circuits. Since the primary components of such resonant tank circuits are resonant tank inductive coils and capacitors, therefore, tags of the present invention do not have these additional resonant tank coil and capacitor components, As a result of having fewer components, therefore, such tags of the present invention are less expensive than prior magnetic-based tags.

Second, tags of the present invention are easier to manufacture since these tags do not have resonant tank coils. Thus, because these tags do not have such coils, they can be printed on a tag circuit or substrate. In contrast, prior magnetic-based tags use discrete resonant tank coil components, which need to be individually mounted on a tag circuit or substrate.

Third, tags of the present invention are easier to apply in a given application. This is because these tags don't have resonant tank coils, which tend to be bulky and rigid. As a result, tags of the present invention are more slender and more flexible.

Fourth, tags of the present invention are more lightweight than prior magnetic-based tags. This is because tags of the present invention have fewer components, since they don't have resonant tank inductive coils and capacitors, in contrast to prior magnetic-based tags.

Fifth, tags of the present invention are more reliable than prior magnetic-based tags. This is because such tags of the present invention have tower components, as explained above. As a result, such tags have fewer components that can fail.

Sixth, tags of the present invention are not frequency-critical, since they do not have resonant tank circuits. In contrast, since prior magnetic-based tags have resonant tank circuits, they are more frequency-critical than tags of the present invention.

While various embodiments of a radio frequency identification tag system using tags arranged for coupling to ground, in accordance with the present invention, have been described hereinabove, the scope of the invention is defined by the following claims.

We claim:

1. A radio frequency identification tag comprising:
   a tag circuit, a tag common electrode and a tag antenna element,
   the tag common electrode and the tag antenna element coupled to the tag circuit,
   the tag common electrode arranged for coupling to ground;
   the tag antenna element arranged for electrostatically receiving an exciter signal and coupling the exciter signal to the tag circuit;
   the tag circuit arranged for becoming energized based on the exciter signal, generating a read signal and coupling the read signal to the tag antenna element; and
   the tag antenna element arranged for electrostatically transmitting the read signal.

2. The radio frequency identification tag of claim 1, wherein the read signal is a reflected signal.

3. The radio frequency identification tag of claim 1, wherein the tag common electrode is arranged for coupling to an article.

4. The radio frequency identification tag of claim 3, wherein the tag common electrode is arranged for coupling to ground by means of the article.

5. The radio frequency identification tag of claim 1, wherein the tag common electrode is arranged for coupling to an animal or a person.

6. The radio frequency identification tag of claim 5, wherein the tag common electrode is arranged for coupling to ground by means of one of the animal or the person.

7. The radio frequency identification tag of claim 1, wherein the tag circuit comprises stored tag information, and the read signal is based on the stored tag information.

8. The radio frequency identification tag of claim 7, wherein the tag antenna element is arranged for receiving a transmitted write signal and coupling the transmitted write signal to the tag circuit, the transmitted write signal comprising write information,
   the tag circuit is arranged for storing the write information as the stored tag information, and
   the read signal is modulated by means of a reflected load modulation based on the stored tag information.

9. The radio frequency identification tag of claim 8, wherein the read signal is further modulated by at least one of an amplitude modulation, a frequency modulation and a phase modulation.

10. The radio frequency identification tag of claim 8, wherein the write information comprises at least one of an operational code and a command.

11. A radio frequency identification tag comprising;
a tag circuit, a tag common electrode, a first tag antenna element and a second tag antenna element;
the tag common electrode and the first and second tag antenna elements coupled to the tag circuit;
the tag common electrode arranged for coupling to ground;
the first tag antenna element arranged for electrostatically receiving an exciter signal and coupling the exciter signal to the tag circuit;
the tag circuit arranged for becoming energized based on the exciter signal, generating a read signal and coupling the read signal to the second tag antenna element; and
the second tag antenna element arranged for electrostatically transmitting the read signal.

12. The radio frequency identification tag of claim 11, wherein the read signal is a transmitted signal.

13. The radio frequency identification tag of claim 11, wherein the tag common electrode is arranged for coupling to an article.

14. The radio frequency identification tag of claim 13, wherein the tag common electrode is arranged for coupling to ground by means of the article.

15. The radio frequency identification tag of claim 11, wherein the tag common electrode is arranged for coupling to an animal or a person.

16. The radio frequency identification tag of claim 15, wherein the tag common electrode is arranged for coupling to ground by means of one of the animal or the person.

17. The radio frequency identification tag of claim 11, wherein the tag circuit comprises stored tag information, and the read signal is based on the stored tag information.

18. The radio frequency identification tag of claim 17, wherein the first tag antenna element is arranged for receiving a transmitted write signal and coupling the transmitted write signal to the tag circuit, the transmitted write signal comprising write information,
the tag circuit is arranged for storing the write information as the stored tag information, and
the read signal is modulated based on the stored tag information.

19. The radio frequency identification tag of claim 18, wherein the read signal is further modulated by at least one of an amplitude modulation, a frequency modulation and a phase modulation.

20. The radio frequency identification tag of claim 18, wherein the write information comprises at least one of an operational code and a command.

21. An electrostatic exciter comprising:
an exciter circuit, an exciter common electrode, and an exciter antenna element,
the exciter common electrode and the exciter antenna element coupled to the exciter circuit, the exciter common electrode arranged for coupling to ground,
the exciter circuit arranged for generating an exciter signal and coupling the exciter signal to the exciter antenna element, and
the exciter antenna element arranged for electrostatically transmitting the exciter signal to a radio frequency identification tag.

22. The electrostatic exciter of claim 21, wherein the exciter circuit arranged for generating a transmitted write signal and coupling the transmitted write signal to the exciter antenna element, the transmitted write signal comprising write information, and
the exciter antenna element arranged for electrostatically transmitting the transmitted write signal.

23. A radio frequency identification tag system comprising:
an electrostatic exciter and at least one radio frequency identification tag,
the electrostatic exciter comprising an exciter circuit, an exciter common electrode and an exciter antenna element, the exciter common electrode and the exciter antenna element coupled to the exciter circuit, the exciter common electrode arranged for coupling to ground,
the exciter circuit arranged for generating an exciter signal and coupling the exciter signal to the exciter antenna element,
the exciter antenna element arranged for electrostatically sending the exciter signal to the at least one radio frequency identification tag, and
the at least one radio frequency identification tag arranged for coupling to ground.

24. The radio frequency identification tag system of claim 23, wherein the exciter circuit is arranged for generating a transmitted write signal and coupling the transmitted write signal to the exciter antenna element, the transmitted write signal comprising write information,
the exciter antenna element arranged for electrostatically sending the transmitted write signal to the at least one radio frequency identification tag, and
the at least one radio frequency identification tag arranged for storing the write information.

25. The radio frequency identification tag system of claim 23, wherein the at least one radio frequency identification tag is arranged for coupling to an article, and arranged for coupling to ground by means of the article.

26. The radio frequency identification tag system of claim 23, wherein the at least one radio frequency identification tag is arranged for coupling to an animal or a person, and arranged for coupling to ground by means of one of the animal or the person.

27. The radio frequency identification tag system of claim 23, the at least one radio frequency identification tag comprising:
a tag circuit, a tag common electrode and a tag antenna element,
the tag common electrode and the tag antenna element coupled to the tag circuit,
the tag common electrode arranged for coupling to ground;
the tag antenna element arranged for electrostatically receiving the exciter signal from the exciter antenna element and coupling the exciter signal to the tag circuit;
the tag circuit arranged for becoming energized based on the exciter signal, generating a read signal and coupling the read signal to the tag antenna element; and
the tag antenna element arranged for electrostatically transmitting the read signal.

28. The radio frequency identification tag system of claim 23, the at least one radio frequency identification tag comprising:
a tag circuit, a tag common electrode, a first tag antenna element and a second tag antenna element,
the tag common electrode, the first and second tag antenna elements coupled to the tag circuit, the tag common electrode arranged for coupling to ground;

the first tag antenna element arranged for electrostatically receiving the exciter signal from the exciter antenna element and coupling the exciter signal to the tag circuit;

the tag circuit arranged for becoming energized based on the exciter signal, generating a read signal and coupling the read signal to the second tag antenna element; and the second tag antenna element arranged for electrostatically transmitting the read signal.

29. An apparatus comprising:

an electrostatic exciter and an electrostatic reader, the electrostatic exciter comprising an exciter circuit, an exciter common electrode and an exciter antenna element, the exciter common electrode and the exciter antenna element coupled to the exciter circuit, the exciter common electrode arranged for coupling to ground, the exciter circuit arranged for generating an exciter signal and coupling the exciter signal to the exciter antenna element, the exciter antenna element arranged for electrostatically transmitting the exciter signal to a radio frequency identification tag arranged for coupling to ground, and the electrostatic reader comprising a reader circuit and a reader antenna element, the reader antenna element coupled to the reader circuit, the reader antenna element arranged for electrostatically receiving a read signal from the radio frequency identification tag and coupling the read signal to the reader circuit.

30. The apparatus of claim 29, wherein the read signal is a reflected signal and is modulated by means of a reflected load modulation based on the stored tag information.

31. The apparatus of claim 30, wherein the read signal is further modulated by at least one of an amplitude modulation, a frequency modulation and a phase modulation.

32. The apparatus of claim 30, wherein the read signal is a transmitted signal and is modulated based on the stored tag information.

33. The apparatus of claim 32, wherein the read signal is further modulated by at least one of an amplitude modulation, a frequency modulation and a phase modulation.

34. The apparatus of claim 29, wherein the exciter circuit is arranged for generating a transmitted write signal and coupling the transmitted write signal to the exciter antenna element, the transmitted write signal comprising write information, and the exciter antenna element arranged for electrostatically sending the transmitted write signal.

35. The apparatus of claim 34, the stored tag information being based on the write information.

36. A radio frequency identification tag system comprising:

an electrostatic exciter, an electrostatic reader and at least one radio frequency identification tag, the electrostatic exciter comprising an exciter circuit, an exciter common electrode and an exciter antenna element, the exciter common electrode and the exciter antenna element coupled to the exciter circuit, the exciter common electrode arranged for coupling to ground, the exciter circuit arranged for generating an exciter signal and coupling the exciter signal to the exciter antenna element, the exciter antenna element arranged for electrostatically sending the exciter signal to the at least one radio frequency identification tag, the electrostatic reader comprising a reader circuit and a reader antenna element, the reader antenna element coupled to the reader circuit, the reader antenna element arranged for electrostatically receiving a read signal from the at least one radio frequency identification tag and coupling the read signal to the reader circuit, the at least one radio frequency identification tag including a stored tag information, the read signal based on the stored tag information, and the reader circuit arranged for detecting the stored tag information.

37. The radio frequency identification tag system of claim 36, wherein the at least one radio frequency identification tag comprises:

a tag circuit, a tag common electrode and a tag antenna element, the tag common electrode and the tag antenna element coupled to the tag circuit, the tag common electrode arranged for coupling to ground;

the tag antenna element arranged for electrostatically receiving the exciter signal from the exciter antenna element and coupling the exciter signal to the tag circuit;

the tag circuit arranged for becoming energized based on the exciter signal, generating the read signal and coupling the read signal to the tag antenna element;

the tag antenna element arranged for electrostatically spending the read signal to the reader antenna element; and the read signal being a reflected signal.

38. The radio frequency identification tag system of claim 37, the exciter circuit arranged for generating a transmitted write signal and coupling the transmitted write signal to the exciter antenna element, the transmitted write signal including write information, and the exciter antenna element arranged for electrostatically sending the transmitted write signal to the at least one radio frequency identification tag.

39. The radio frequency identification tag system of claim 38, the tag antenna element arranged for receiving the transmitted write signal and coupling the transmitted write signal to the tag circuit, the tag circuit arranged for storing the write information as the stored tag information, and the read signal being modulated by means of a reflected load modulation based on the stored tag information.

40. The radio frequency identification tag system of claim 39, the read signal being further modulated by at least one of an amplitude modulation, a frequency modulation and a phase modulation.

41. The radio frequency identification tag system of claim 37, the tag common electrode arranged for coupling to an article, and arranged for coupling to ground by means of the article.

42. The radio frequency identification tag system of claim 37, the tag common electrode arranged for coupling to an animal or a person, and arranged for coupling to ground by means of one of the animal or the person.

43. The radio frequency identification tag system of claim 36, the at least one radio frequency identification tag including:
   a tag circuit, a tag common electrode, a first tag antenna element and a second tag antenna element,
   the tag common electrode, the first and second tag antenna elements coupled to the tag circuit,
   the tag common electrode arranged for coupling to ground;
   the first tag antenna element arranged for electrostatically receiving the exciter signal from the exciter antenna element and coupling the exciter signal to the tag circuit;
   the tag circuit arranged for becoming energized based on the exciter signal, generating the read signal and coupling the read signal to the second tag antenna element;
   the second tag antenna element arranged for electrostatically sending the read signal to the reader antenna element; and
   the read signal being a transmitted signal.

44. The radio frequency identification tag system of claim 43, wherein the exciter circuit is arranged for generating a transmitted write signal and coupling the transmitted write signal to the exciter antenna element, the transmitted write signal comprising write information, and
   the exciter antenna element arranged for electrostatically sending the transmitted write signal to the at least one radio frequency identification tag.

45. The radio frequency identification tag system of claim 44, wherein the first tag antenna element is arranged for receiving the transmitted write signal and coupling the transmitted write signal to the tag circuit,
   the tag circuit is arranged for storing the write information as the stored tag information, and
   the read signal is modulated based on the stored tag information.

46. The radio frequency identification tag system of claim 45, wherein the read signal is further modulated by at least one of an amplitude modulation, a frequency modulation and a phase modulation.

47. The radio frequency identification tag system of claim 43, wherein the tag common electrode is arranged for coupling to an article, and is arranged for coupling to ground by means of the article.

48. The radio frequency identification tag system of claim 43, wherein the tag common electrode is arranged for coupling to an animal or a person, and is arranged for coupling to ground by means of one of the animal or the person.

49. A livestock management system comprising:
   a corral for holding a livestock, the corral having a sensing chute, the sensing chute comprising a first fence member and a second fence member, the first fence member being separated from the second fence member by a width to singularly direct the livestock there through;
   an exciter/reader, the exciter/reader comprising an exciter antenna element and a reader antenna element, each of the exciter antenna element and the reader antenna element being formed in at least one of the first fence member and the second fence member, the exciter/reader adapted to generate an electrostatic power and data signal for transmission from the exciter antenna element and to receive an electrostatic read signal at the reader antenna element;
   the livestock having a radio frequency identification tag, the radio frequency identification tag having a tag common electrode coupled to the livestock and to a tag circuit and a tag antenna element coupled to the tag circuit and insulated from the livestock, the radio frequency identification tag adapted to receive the electrostatic power and data signal from the exciter/reader and to generate aid transmit the electrostatic read signal at the tag antenna element;
   the exciter/reader coupled to ground; and within the sensing chute, the tag common electrode coupled to ground by means of the livestock.

50. The livestock management system of claim 49, wherein the radio frequency identification tag is secured in an ear of the livestock and the exciter antenna element and the reader antenna element are positioned within at least one of the first fence member and the second fence member, approximate to the ear.

51. The livestock management system of claim 49, wherein the width is slightly wider than an expected widest livestock.

52. The livestock management system of claim 49, wherein the radio frequency identification tag comprises a front plate, a post secured at a first end within an aperture formed in the front plate and at a second end to a back plate.

53. The livestock management system of claim 52, wherein the tag antenna element comprises a conductor formed within a body of the front plate.

54. The livestock management system of claim 52, wherein the tag common electrode comprises the post, the post being adapted to engage an aperture formed in an ear of the livestock and to be secured thereto by the front plate and the back plate.

55. The livestock management system of claim 52, wherein the tag circuit is formed within a body of the front plate.

56. The livestock management system of claim 52, wherein the back plate is formed from insulating plastic.

57. The livestock management system of claim 52, wherein the back plate is formed from electrically conducting plastic.

* * * * *

UNITED STATES PATENT AND TRADEMARK OFFICE
CERTIFICATE OF CORRECTION

PATENT NO.   : 6,411,213 B1  Page 1 of 1
DATED        : June 25, 2002
INVENTOR(S)  : Vega et al.

It is certified that error appears in the above-identified patent and that said Letters Patent is hereby corrected as shown below:

<u>Column 14,</u>
Line 38, please replace "spending" with -- sending --.

Signed and Sealed this

Seventeenth Day of June, 2003

JAMES E. ROGAN
*Director of the United States Patent and Trademark Office*